United States Patent
Hu et al.

(10) Patent No.: US 12,376,092 B2
(45) Date of Patent: Jul. 29, 2025

(54) ACTIVE BANDWIDTH PART CONFIGURATION FOR EVOLVED REDCAP USER EQUIPMENTS

(71) Applicant: Samsung Electronics Co., Ltd., Gyeonggi-do (KR)

(72) Inventors: Liang Hu, San Diego, CA (US); Philippe Sartori, Naperville, IL (US)

(73) Assignee: Samsung Electronics Co., Ltd (KR)

( * ) Notice: Subject to any disclaimer, the term of this patent is extended or adjusted under 35 U.S.C. 154(b) by 425 days.

(21) Appl. No.: 18/074,196

(22) Filed: Dec. 2, 2022

(65) Prior Publication Data

US 2023/0209520 A1    Jun. 29, 2023

Related U.S. Application Data

(60) Provisional application No. 63/293,379, filed on Dec. 23, 2021, provisional application No. 63/407,355, (Continued)

(51) Int. Cl.
*H04W 72/0453* (2023.01)
*H04W 72/231* (2023.01)
*H04W 72/232* (2023.01)

(52) U.S. Cl.
CPC ..... *H04W 72/0453* (2013.01); *H04W 72/231* (2023.01); *H04W 72/232* (2023.01)

(58) Field of Classification Search
CPC ............. H04W 72/0453; H04W 72/23; H04W 72/231; H04W 72/232
See application file for complete search history.

(56) References Cited

U.S. PATENT DOCUMENTS 10,785,759 B2    9/2020    Lin et al.
2021/0306220 A1    9/2021    Xu et al.
(Continued)

FOREIGN PATENT DOCUMENTS

WO    WO 2021/146887    7/2021
WO    WO 2022/072506    4/2022

OTHER PUBLICATIONS

Ericsson, "New SID on Study on further NR RedCap UE complexity reduction", 3GPP TSG RAN meeting #94e RP-213661, Electronic Meeting, Dec. 6-7, 2021, pp. 4.
(Continued)

*Primary Examiner* — Kevin C. Harper
(74) *Attorney, Agent, or Firm* — The Farrell Law Firm, P.C.

(57) ABSTRACT

An apparatus and a method are disclosed for wireless communication with an external device. The apparatus may be a user equipment (UE) provided for wireless communication with an external device. The UE includes a transceiver and a processor. The processor is configured to receive, via the transceiver, a radio resource control (RRC) signal; determine a virtual bandwidth part (vBWP) based on the RRC signal, the vBWP including a plurality of narrowband (NB) bandwidth parts (BWPs) in a carrier bandwidth for the UE to perform communication at a given time instance, and determine a bandwidth location in the carrier bandwidth of at least one of the plurality of NB BWPs. If a first relative frequency of the bandwidth location in a first NB BWP is the same as a second relative frequency of a bandwidth location in a second NB BWP, then information included in downlink control information (DCI) is re-used to identify the bandwidth location.

20 Claims, 12 Drawing Sheets

Related U.S. Application Data filed on Sep. 16, 2022, provisional application No. 63/419,160, filed on Oct. 25, 2022.

(56) References Cited

U.S. PATENT DOCUMENTS

| | | |
|---|---|---|
| 2021/0314924 A1 | 10/2021 | Takeda et al. |
| 2022/0183008 A1 | 6/2022 | Zheng et al. |
| 2023/0090288 A1* | 3/2023 | Sakhnini ............... H04L 5/0012 370/329 |
| 2023/0144736 A1* | 5/2023 | Yao .................. H04W 72/0457 370/329 |
| 2023/0189232 A1* | 6/2023 | Rastegardoost ...... H04L 5/0053 370/329 |

OTHER PUBLICATIONS

3GPP TS 38.214 V16.5.0 (Mar. 2021) Technical Specification 3rd Generation Partnership Project; Technical Specification Group Radio Access Network; NR; Physical layer procedures for data (Release 16), pp. 171.

3GPP TS 38.331 V16.4.1 (Mar. 2021) Technical Specification 3rd Generation Partnership Project; Technical Specification Group Radio Access Network; NR; Radio Resource Control (RRC) protocol specification (Release 16), pp. 954.

* cited by examiner

|  | FR1 | | | FR2 |
|---|---|---|---|---|
|  | Baseline device | RedCap device | Baseline device | RedCap device |
| Maximum device bandwidth | 100 MHz | 20 MHz | 200 MHz | 100 MHz |
| Minimum number of device receive branches | 2 or 4, depending on the frequency band | 1 for bands where a baseline NR device is required to have 2; TBD 1 or 2 for bands where a baseline NR device is required to have 4 | 2 | 1 |
| Maximum number of downlink MIMO layers | 2 or 4, depending on the frequency band | 1 for RedCap device with 1 Rx branch; 2 for RedCap device with 2 Rx branches; | 2 | 1 |
| Maximum downlink modulation order | 256QAM | 64QAM | 64QAM | 64QAM |
| Duplex operation | FD-FDD, TDD | UE may implement HD-FDD FD-FDD, TDD | TDD | TDD |

FIG. 2

ACTIVE BANDWIDTH PART CONFIGURATION FOR EVOLVED REDCAP USER EQUIPMENTS

CROSS-REFERENCE TO RELATED APPLICATION(S)

This application claims the priority benefit under 35 U.S.C. § 119(e) of U.S. Provisional Application No. 63/293,379, filed on Dec. 23, 2021; U.S. Provisional Application No. 63/407,355, filed on Sep. 16, 2022; and U.S. Provisional Application No. 63/419,160, filed on Oct. 25, 2022, the disclosures of which are incorporated by reference in their entireties as if fully set forth herein.

TECHNICAL FIELD

The disclosure generally relates to active bandwidth part (BWP) configuration. More particularly, the subject matter disclosed herein relates to improvements to frequency diversity and frequency selectivity for narrow band (NB) user equipment (UE).

BACKGROUND

The $3^{rd}$ generation partnership project (3GPP) standardized UEs with limited capabilities (i.e., reduced capacity (RedCap) UEs) for low-cost applications, such as sensors, video-surveillance, etc. One of the aspects of RedCap is that bandwidth is limited to 20 Mhz.

Furthermore, RedCap UEs bandwidth may also be limited to 5 Mhz. This type of RedCap UE may be defined as a narrow band (NB) UE.

A wireless network may host many different types of devices having many different frequencies and/or bandwidths. The network impact on a cell due to the coexistence of 5 Mhz RedCap UEs, 20 Mhz RedCap UEs, and non RedCap UEs should be considered so as to avoid interference and to optimize data transmission.

If a network operating bandwidth is reduced to 5 MHz, the BWP configuration and switching mechanism should be enhanced for NB RedCap UEs. Operating at 5 MHz or less, however, may lead to a significant loss in frequency diversity, especially indoors. Additionally, the coverage of a physical downlink shared channel (PDSCH) and a physical downlink control channel (PDCCH) can be degraded.

Furthermore, for such low bandwidths, there can be traffic congestion when a large number of NB UEs are in the same 5 MHz BWP. Additionally, when NB UEs share the bandwidth with wider band (WB) UEs, there is a risk of fragmenting the bandwidth.

In particular, the physical uplink control channel (PUCCH) may be configured at the edge of a resource block (RB) within the UL BWP for the cell specific PUCCH configuration. Thus, a PUCCH resource of the NB UE may be somewhere in the middle of a wider band UE.

Accordingly, a need exists for techniques to avoid resource fragmentation, and techniques to provide frequency diversity and frequency selectivity for NB UEs.

SUMMARY

The present disclosure has been made to address the above-mentioned problems and disadvantages, and to provide at least the advantages described below.

In accordance with an aspect of the disclosure, a UE is provided for wireless communication with an external device. The UE includes a transceiver and a processor. The processor is configured to receive, via the transceiver, a radio resource control (RRC) signal; determine a virtual bandwidth part (vBWP) based on the RRC signal, the vBWP including a plurality of narrowband (NB) bandwidth parts (BWPs) in a carrier bandwidth for the UE to perform communication at a given time instance, and determine a bandwidth location in the carrier bandwidth of at least one of the plurality of NB BWPs. If a first relative frequency of the bandwidth location in a first NB BWP is the same as a second relative frequency of a bandwidth location in a second NB BWP, then information included in downlink control information (DCI) is re-used to identify the bandwidth location.

In accordance with another aspect of the disclosure, a method performed by a UE for wireless communication with an external device includes receiving a radio resource control (RRC) signal; determining a vBWP based on the RRC signal, the vBWP including a plurality of NB BWPs in a carrier bandwidth for the UE to perform communication at a given time instance, and determining a bandwidth location in the carrier bandwidth of at least one of the plurality of NB BWPs. If a first relative frequency of the bandwidth location in a first NB BWP is the same as a second relative frequency in a second NB BWP, then information included in DCI is re-used to identify the bandwidth location.

BRIEF DESCRIPTION OF THE DRAWING

In the following section, the aspects of the subject matter disclosed herein will be described with reference to exemplary embodiments illustrated in the figures, in which:

FIG. 2 illustrates a table comparing frequency range 1 (FR1) UE devices with frequency range 2 (FR2) UE devices, according to an embodiment;

DETAILED DESCRIPTION

Figure 1:
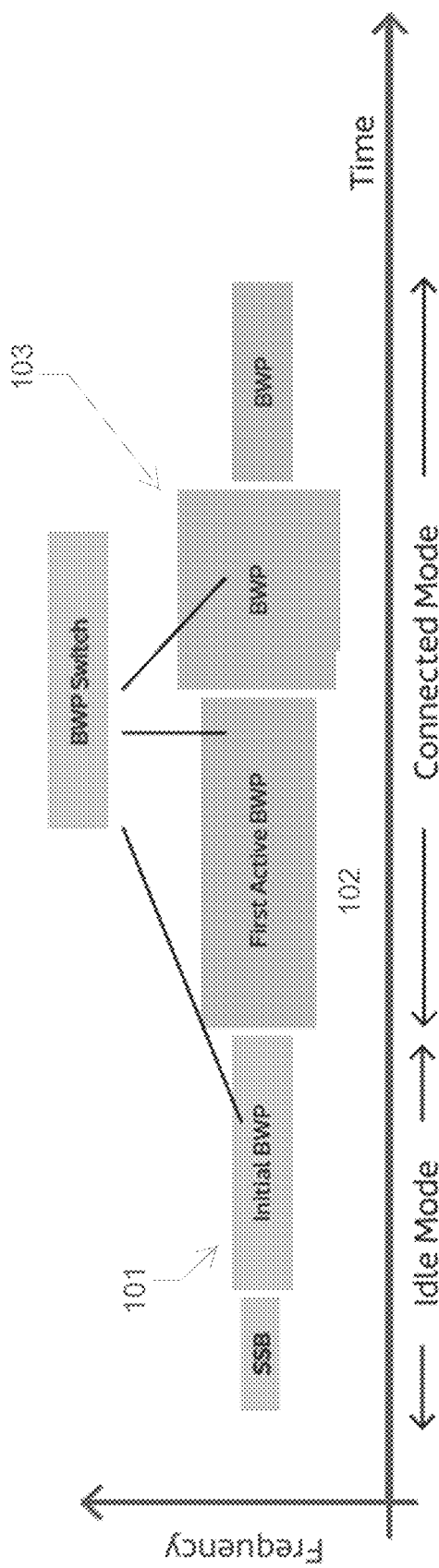
FIG. 1 illustrates different BWP allocation types available for a UE in different RRC states, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

For $5^{th}$ generation (5G) new radio (NR), a BWP is a contiguous set of physical resource blocks (PRBs) on a given carrier bandwidth. These RBs are selected from a contiguous subset of the common RBs for a given numerology (u), denoted by BWP. Each BWP defined for a numerology can have different subcarrier spacing parameters, symbol duration parameters, and/or cyclic prefix (CP) length parameters.

A UE can be configured with a maximum of 4 BWPs for downlink (DL) and uplink (UL), but at a given point of time only one BWP may be active for DL and one BWP may be active for UL. A BWP allows UEs to operate in a narrow bandwidth, and when a user demands more data (e.g., bursty traffic), it can inform a gNB to enable WB.

When a gNB configures a BWP, it may include a BWP numerology (u), a BWP bandwidth size, a frequency location (NR-ARFCN), and/or a control resource set (CORESET).

With respect to a DL, a UE is not expected to receive a PDSCH, a PDCCH, a channel state information (CSI)-reference signal (RS), or a tracking reference signal (TRS) outside an active BWP. Each DL BWP may include at least one CORESET with a UE specific search space (USS) while a primary carrier of at least one of the configured DL BWPs includes one CORESET with a common search space (CSS).

With respect to a UL, the UE should not transmit a PUSCH or a PUCCH outside an active BWP. UEs are expected to receive and transmit within the frequency range configured for the active BWPs with the associated numerologies. However, there are exceptions; a UE may perform radio resource management (RRM) measurement or transmit a sounding reference signal (SRS) outside of its active BWP via a measurement gap.

BWP selection (or BWP switching) can be done by performing dedicated RRC signaling, over PDCCH channel DL control information (DCI)—DCI 0_1 (UL Grant) and DCI 1_0 (DL Scheduling), using a bwp-inactivityTimer-ServingCellConfig.bwp-InactivityTimer, and/or using a media access control (MAC) control element (CE).

A DCI based mechanism, although more prompt than one based on the MAC CE, may require additional consideration for error case handling, i.e., the case when a UE fails to decode the DCI containing the BWP activation/deactivation command. To help recover from such DCI loss scenarios, the activation/deactivation of a DL BWP (or a DL/UL BWP pair for the case of an unpaired spectrum) using a timer (bwp-inactivityTimer) may be used. With this mechanism, if a UE is not scheduled for a certain amount of time, i.e., by expiration of a timer, the UE may switch its active DL BWP (or DL/UL BWP pair) to a default one.

There may be an initial active BWP for a UE during the initial access until the UE is explicitly configured with BWPs during or after RRC connection establishment. The initial active BWP may be designated as the default BWP, unless configured otherwise.

For some UEs, there may be at most one active DL BWP and at most one active UL BWP. A hybrid automatic repeat request (HARQ) retransmission across different BWPs may be supported when a UE's active BWP is switched.

FIG. 1 illustrates different BWP allocation types available for a UE in different RRC states, according to an embodiment.

Referring to FIG. 1, idle mode BWPs are smaller than connected mode BWPs. An initial BWP 101, an active BWP (UE specific) 102, and a default BWP (UE specific) 103 may be available as BWP types.

The initial BWP is used to perform initial access procedure, and includes parameters like remaining minimum system information (RMSI), CORESET #0 and RMSI frequency location/bandwidth/SCS. It can be 24-96 PRBs with different settings and relaxed to wider BWP after RMSI decoding.

The active BWP may be defined as UE specific. It is the first BWP where a UE starts a data transfer after a radio resource control (RRC) configuration/reconfiguration. The very first active BWP should be different from the default BWP.

FIG. 2 illustrates a table comparing FR1 UE devices with FR2 UE devices, according to an embodiment.

Bandwidth reduction, reducing the maximum number of multiple input multiple output (MIMO) layers, and the relaxation of the maximum DL modulation order all help reduce baseband complexity. Reducing the minimum number of required receive branches and allowing half-duplex (HD) operations in all bands also helps reduce the bill of material costs in terms of antennas and radio frequency (RF) components.

Referring to FIG. 2, a "maximum device bandwidth" is a baseline NR device that is required to support 100 MHz in FR1, and 200 MHz in FR2, for transmission and reception. For RedCap, these requirements are reduced to 20 MHz and 100 MHz, respectively. However, such bandwidth reductions still allow physical channels and signals specified for initial acquisition to be readily reusable for RedCap devices, thereby minimizing the impact on a network and device deployment when introducing RedCap to support the new use cases.

A "minimum number of device receive branches" is the number of receive branches and is related to the number of receive antennas. Reducing the number of receive branches consequently reduces the number of receive antennas, providing cost savings. The requirements on the minimum number of receive branches depends on frequency bands. Some frequency bands (most of the FR1 frequency-division duplex (FDD) bands, a handful of FR1 time-division duplex (TDD) bands, and all FR2 bands) require a baseline NR device to be equipped with two receive branches, whereas some other frequency bands, mostly in the FR1 TDD bands, require the device to be equipped with four receive branches.

A "maximum number of DL MIMO layers" is the maximum number of DL MIMO layers for a RedCap device that is the same as the number of receive branches it supports. This is a reduction compared to the requirements for a baseline device.

A "maximum DL modulation order" is a baseline NR device that is required to support 256 quadrature amplitude modulation (QAM) in the DL in FR1. For a RedCap device, the support of DL 256QAM is optional. For FR1 UL and FR2, both DL and UL, a RedCap device is required to support 64QAM, which is the same as the requirement for a baseline device.

A "duplex operation" is relaxation that is for operations in FDD bands. A baseline NR device is required to support a full duplex (FD) operation in an FDD band, i.e., transmitting and receiving on different frequencies at the same time. A typical FD device incorporates a duplex filter to isolate the interference between the device's transmit and receive paths. In practice, the same device may need to support multiple FDD bands; therefore, multiple duplex filters may be needed to support the FD-FDD operation. For a RedCap device, the support of FD-FDD is optional, i.e., it is not required to receive in the DL frequency while transmitting in the UL frequency, and vice versa. Such a duplex operation is referred to as half duplex (HD) FDD (HD-FDD). HD-FDD obviates the need for duplex filters. Instead, a switch can be used to select the transmitter or receiver to connect to the antenna. As a switch is less expensive than multiple duplexers, cost savings are achieved.

For transmission over a vBWP, NB UEs may transmit on 5 MHz bandwidth or less. That is, a vBWP may be logically equivalent to a BWP, and is made up of a plurality of NB BWPs. The vBWP advantageously frees up frequency resources since only a NB BWP may be used at a given time. As such, frequency diversity should be provided through hopping. "Hopping" is the act of changing a vBWP location along a carrier bandwidth and time. A carrier bandwidth may be a WB bandwidth (or larger) capable of supporting multiple NB BWP therein. For example, bandwidth may be 20 MHZ and an NB BWP may be 5 MHZ. It is noted that the carrier bandwidth is not limited to 20 MHZ and may be larger or smaller.

Logically, vBWP transmission is similar to BWP transmission. According to an embodiment, hopping within the 5 MHz bandwidth occupied by these NB UEs is possible, but this is suboptimal, given that even at 5 MHz, the frequency diversity might not be enough, especially indoors, with low delay spread environments.

According to another embodiment, a vBWP is used to perform BWP hopping.

For an NB UE, to achieve frequency diversity gains, frequency hopping is one of the methods that can be used.

Hopping within a limited system bandwidth is also beneficial to mitigate persistent interference because an NB bandwidth operation may be more prone to such interference (affecting a large portion of the active BWP), such as for stationary devices where interference is not randomized by UE movement and may persist for a relatively long time.

It may be beneficial to have some sort of NB BWP hopping mechanism.

Figure 3:
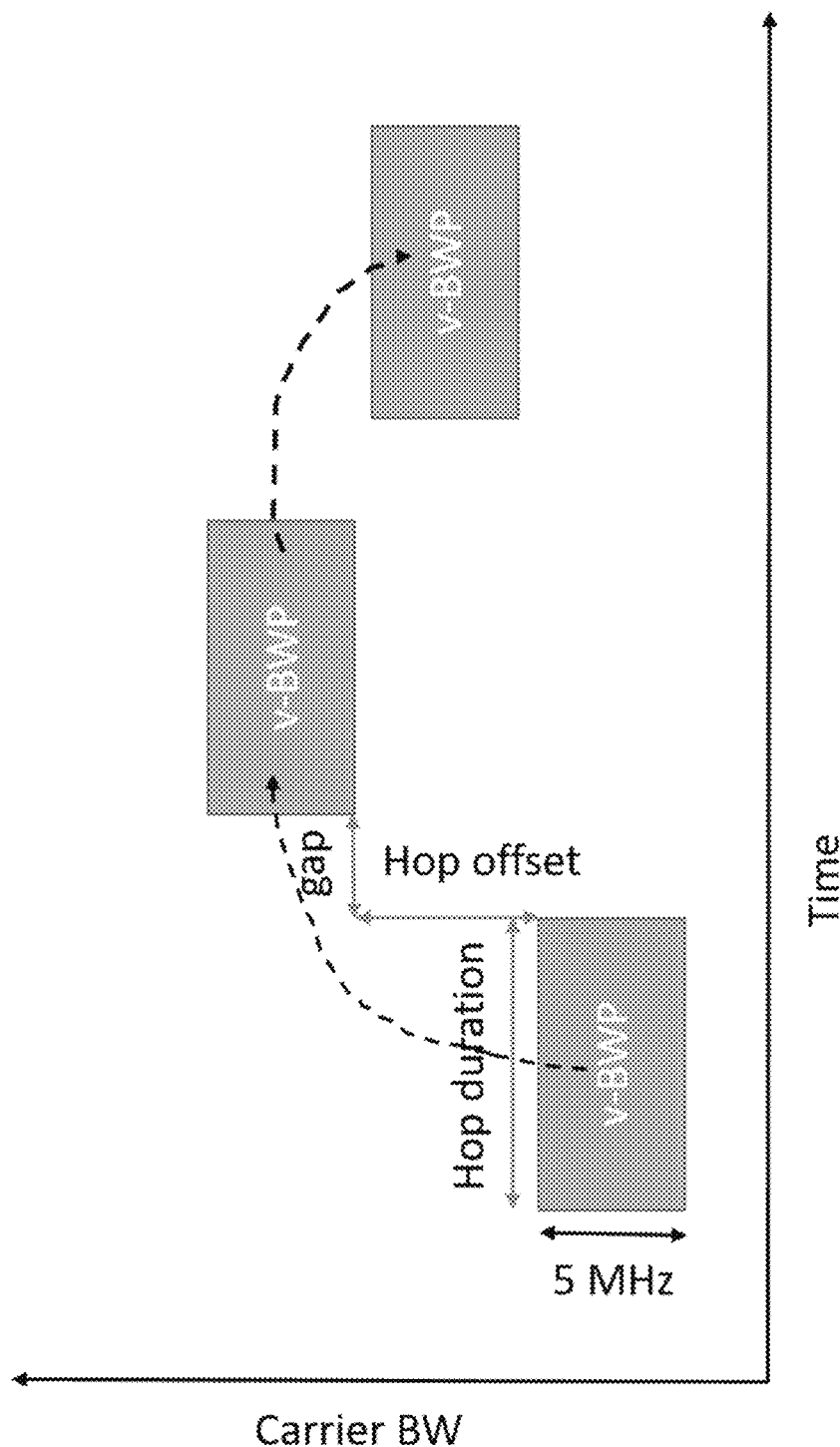
FIG. 3 illustrates an NB UE vBWP that is hopping in the frequency domain, according to an embodiment.

FIG. 3 illustrates an NB UE vBWP that is hopping in the frequency domain, according to an embodiment.

Referring to FIG. 3, resources within the vBWP relative to a reference point within the BWP hop do not change. This simplifies the gNB scheduler and the specification development by having a transparent hopping mechanism.

Each hop sequence may be determined by the hop duration (in terms of a number of slots), the gap (in terms of a number of slots), and the hop offset, in terms of PRBs.

In order to include the hopping sequence, the concept of a vBWP is defined herein. A vBWP is analogous to a regular BWP, but the PRBs comprising the vBWP change in time in a manner analogous to what is illustrated in FIG. 3. In other words, the vBWP includes a set of NB BWPs and the UE operates at a given NB BWP at a time instance. When operating on a given BWP, the UEs interrupt and switch to a specific active BWP for paging reception, system information (SI) update, radio link monitoring and beam failure detection.

In terms of signaling, a vBWP can be defined reusing an information element (IE) defining a BWP (or using a similar one), including a hopping sequence, a specified gap value, a hop offset, and/or a hop duration.

For example, an IE to configure a vBWP may be provided as follows:

```
vBWP::=   SEQUENCE {
    locationAndBandwidth   INTEGER (0..37949),
    subcarrierSpacing           SubcarrierSpacing,
    cyclicPrefix                ENUMERATED { extended }
    hopping_sequence            INTEGER (0..Max1),
    Hopping_offset              INTEGER (0..MAX2),
    Hopping_duration            INTEGER (0..MAX3),
    Hopping_gap                 INTEGER (0..MAX4),
}
vBWP-DL ::=   SEQUENCE {
    vbwp-Id              vBWP-Id:= ,
    vbwp-Common          vBWP-DownlinkCommon
    vbwp-Dedicated       vBWP-DownlinkDedicated
    ...
}
vBWP-DownlinkCommon ::=   SEQUENCE {
    genericParameters vBWP,
    pdcch-ConfigCommon SetupRelease { PDCCH-ConfigCommon }
    pdsch-ConfigCommon SetupRelease { PDSCH-ConfigCommon }
    ...
}
vBWP-DownlinkDedicated ::=   SEQUENCE {
    pdcch-Config              SetupRelease { PDCCH-Config }
    pdsch-Config              SetupRelease { PDSCH-Config }
    sps-Config              SetupRelease { SPS-Config }
    radioLinkMonitoringConfig   SetupRelease { RadioLinkMonitoringConfig }
    ...
}
vBWP-Uplink ::=        SEQUENCE {
    vbwp-Id              vBWP-Id,
    vbwp-Common          vBWP-UplinkCommon
    vbwp-Dedicated       vBWP-UplinkDedicated
    ...
}
vBWP-UplinkCommon ::=   SEQUENCE {
    genericParameters   vBWP,
    rach-ConfigCommon SetupRelease { RACH-ConfigCommon }
    pusch-ConfigCommon SetupRelease { PUSCH-ConfigCommon }
    pucch-ConfigCommon SetupRelease { PUCCH-ConfigCommon }
    ...
}
vBWP-UplinkDedicated ::=   SEQUENCE {
    pucch-Config              SetupRelease { PUCCH-Config }       OPTIONAL,--Need M
    pusch-Config              SetupRelease { PUSCH-Config }       OPTIONAL,--Need M
    configuredGrantConfig           SetupRelease { ConfiguredGrantConfig }   OPTIONAL,--Need M
    srs-Config              SetupRelease { SRS-Config }         OPTIONAL,--Need M
    beamFailureRecoveryConfig  SetupRelease
    { BeamFailureRecoveryConfig } OPTIONAL,--Need M
    ...
}
```

The vBWPs may be allocated to the NB UEs in a similar manner to the BWPs. An NB UE can be allocated a maximum number of vBWPs (e.g., 4), and can have a single active vBWP at a time where each vBWP includes a set of NB BWPs at different time instances.

A difference (and advantage) of the vBWP concept over BWP hopping is that conventionally, a UE can only be configured with up to 4 BWPs. Thus, an NB UE is only able to do BWP hopping over 20 MHz. However, with the vBWP allocation, the NB UE can operate and hop over much larger bandwidth beyond the 20 MHz bandwidth (e.g., 100 MHz or more).

Figure 4:
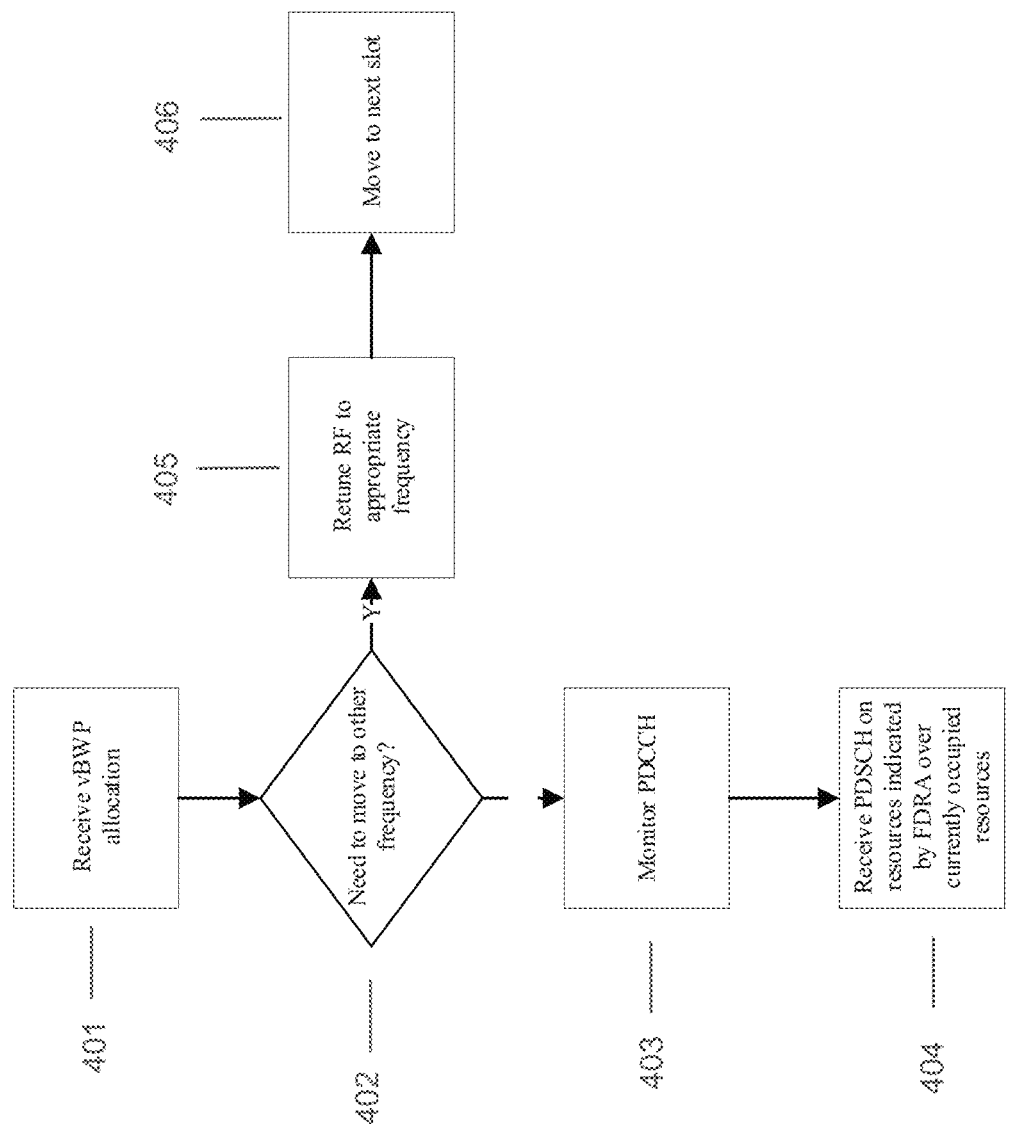
FIG. 4 illustrates a flowchart of a UE for receiving the PDCCH with a vBWP operation, according to an embodiment.

FIG. 4 illustrates a flowchart of a UE for receiving the PDCCH with a vBWP operation, according to an embodiment The operation to receive the PDCCH with vBWP is illustrated in FIG. 4. The operation is similar for a PUCCH transmission.

Referring to FIG. 4, in step 401, the UE receives a vBWP allocation over RRC signaling. For example, the UE may determine the vBWP including a plurality of NB BWPs, each having a smaller bandwidth than the carrier bandwidth. After acknowledging this allocation, the UE operates on the vBWP until told not to do so (e.g., until the UE identifies an interrupt). In step 402, the UE determines whether to move to another frequency (e.g., the UE determines a bandwidth location (e.g., the starting RB index relative to a common reference point in the carrier bandwidth and the number of consecutive RBs after the starting RB) of an NB BWPs). For example, the UE may determine to move to another relative frequency (e.g., the resource block index within a given NB BWP relative to the starting RB of a given NB BWPs (which hops over time)). If the frequency needs to be moved in step 402, then the frequency is retuned to an appropriate frequency in step 405. As shown in the vBWP definition, there is a gap between two subbands (blocks) at different frequencies. This gap is used for the NB UE to retune its RF to the next frequency center for the next block in the vBWP. If the slot is in the gap, the NB UE does not monitor any channel. At step 406, the UE moves to the next slot.

If the frequency does not need to be moved in step 402, then in step 403 the UE monitors PDCCH at the given frequency. That is, when there is no need for another frequency, the UE operates as usual, assuming that the current subband (block) of the vBWP is a BWP. This has a benefit that no signaling change is needed. That is, the same DCI can be used as for BWP, and the NB procedures are similar, except that they apply on the vBWP instead of the BWP.

In step 404, the UE receives the PDSCH. If the UE receives a DCI, it applies a frequency domain resource allocation (FDRA) for the current frequency block of the vBWP, assuming it was a BWP.

Exceptions may be needed for paging and system information block (SIB) updates. During a vBWP operation, the NB UE should periodically interrupt the vBWP operation and switch to a specific active BWP to monitor a synchronization signal block (SSB) and a CORESET #0 for performing paging reception. Likewise, the NB UE should also periodically interrupt the vBWP operation to perform an SIB information update by switching to a specific active BWP for decoding CSS #0 or another CSS for receiving SIB information updates. After the paging or SIB information reception, the NB UE re-starts the vBWP operation, as described above.

On the other hand, during vBWP operation, the NB UE can be on-demand interrupted via the vBWP operation and switch to a specific active BWP to monitor an SSB and a CORESET #0 for performing paging reception. Likewise, the NB UE can also on-demand interrupt the vBWP operation to perform an SIB information update by switching to a specific active BWP for decoding CSS #0 or other CSS for receiving SIB information updates. After the paging or SIB information reception, the NB UE re-starts the vBWP operation as described above.

In order to implement these exceptions for paging and SIB updates, several solutions are possible. For example, a configuration message (e.g., an RRC configuration message) may indicate that the UE needs to switch to an active BWP containing, e.g., CORESET 0, and the times at which such switching needs to occur. The UE may then assume that the configuration for the active BWP with CORESET #0 takes precedence over the vBWP and BWP switching then automatically occurs. Additionally or alternatively, the hopping pattern for the vBWP may be defined in such a way that it periodically goes to the BWP containing CORESET #0. In such a case, the UE only needs the vBWP configuration, and only needs to monitor the vBWP, unless instructed to do otherwise. Furthermore, an implicit solution is to define the vBWP, which consist of a set of BWPs, such that among which one of the BWPs contains CORESET #0 and SSB transmissions. In this case, the NB UE performs paging and SIB information reception within the defined operation of the vBWP operation, without the need to do extra frequency retuning to other BWPs.

In addition, the best BWP (e.g., the BWP having the least likelihood of interference to improve frequency diversity) may be selected, instead of blindly performing hopping. An NB UE, based on its measurements (e.g., for interference) or capability may prefer to perform communication on an NB active BWP where the interference is low. Hence, it may be desirable to have the option for the NB UE to initiate/request a preferred NB BWP.

In particular, the NB UE should measure the interference in terms of a received signal strength indicator (RSSI) in the current NB DL/UL BWP and store the measured values for a given time window. Within this time window, the NB UE has hopped over a set of NB BWPs and obtained the set of interference measurements in each of the NB BWPs.

Then, an NB UE can decide which NB BWP to re-start the hopping. Thus, the initial transition of an NB UE to one of the active NB BWPs can be network initiated/controlled, implicit (e.g., based on a random selection by NB UEs), and/or NB UE initialized/requested (e.g., an NB UE may send a preferred active BWP and or a preferred BWP hopping pattern to be used after initial access).

Each NB UE first determines the $1^{st}$ DL and UL active NB BWP among a set of NB BWPs, based on a random selection, for example. Alternatively, each NB UE is assigned, by the gNB, $1^{st}$ DL and UL active NB BWP among a set of NB BWPs. An NB UE can request a specific active NB BWP via RRC signaling or UL control information (UCI) signaling based on its local measurements. The NB UE can also request a specific hopping BWP pattern in the RRC message to the gNB, in addition to the specific $1^{st}$ NB BWP.

Thereafter, the NB UE performs interference measurements within its NB BWP and continues using the assigned/selected NB BWP for a given time of duration, i.e., a hop duration, until it expires. Within the NB BWP, the NB UE performs similar procedures to WB UE procedures, e.g., resource allocation and scheduling, and/or HARQ. Within a set of NB BWPs, the allocated resources and HARQ settings are the same in each of the NB BWPs.

After a timer (e.g., the hop duration) expires, the NB UE shall re-select the 1$^{st}$ NB BWP for a given NB hopping pattern. The NB UE then follows another set of NB BWPs to perform frequency hopping.

Note that the hop offset as shown FIG. 3 can be cell specific, which means all hopping RedCap UEs have the same hop offset to simplify the overall design. There is also a gap between two consecutive NB BWPs to allow for the delay (e.g., to perform retuning) when performing BWP switching.

When an NB UE performs NB BWP frequency hopping, it also monitors paging, SI updates, radio resource management (RRM), radio link failure (RLF), and bidirectional forwarding detection (BFD) in a specific NB BWP. In this case, each of the NB BWP should include the CORESET CSS and or an SSB reference signal for performing paging reception, SI updates, RRM, RLF, and BFD.

Figure 5:
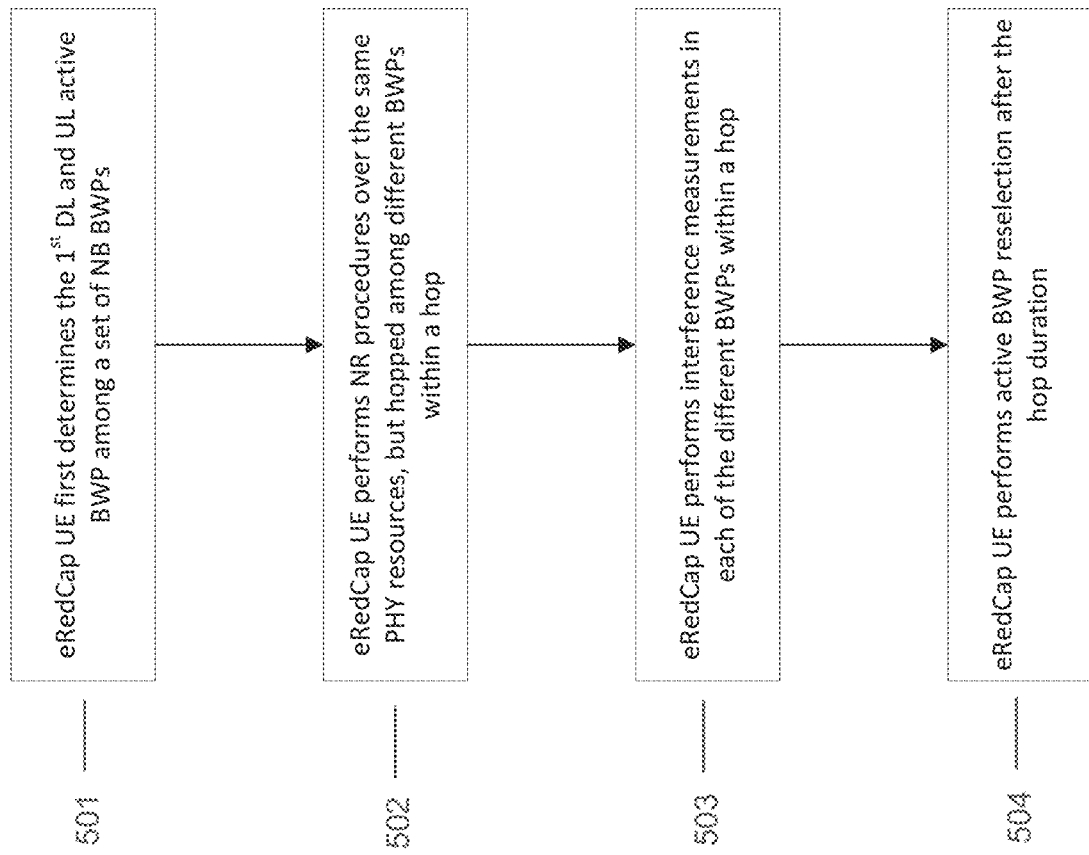
FIG. 5 illustrates an NB UE hopping operation when performing active BWP reselection, according to an embodiment.

FIG. 5 illustrates an NB UE hopping operation when performing active BWP reselection, according to an embodiment.

Referring to FIG. 5, in step 501, an evolved reduced capability (eRedCap) UE (e.g., an NB UE) first determines the 1$^{st}$ DL and UL active BWP among a set of NB BWPs. In step 502, an eRedCap UE performs NR procedures over the same PHY resources, but hopped among different BWPs within a hop. In step 503, eRedCap UE performs interference measurements in each of the different BWPs within a hop. In step 504, eRedCap UE performs active BWP reselection after the hop duration.

To mitigate resource fragmentation, steps may be taken when NB UEs are located at the edge of the carrier bandwidth. When NB UEs (e.g., 5 MHz) share the bandwidth with other UEs, there is a risk that the bandwidth can be fragmented.

Figure 6:
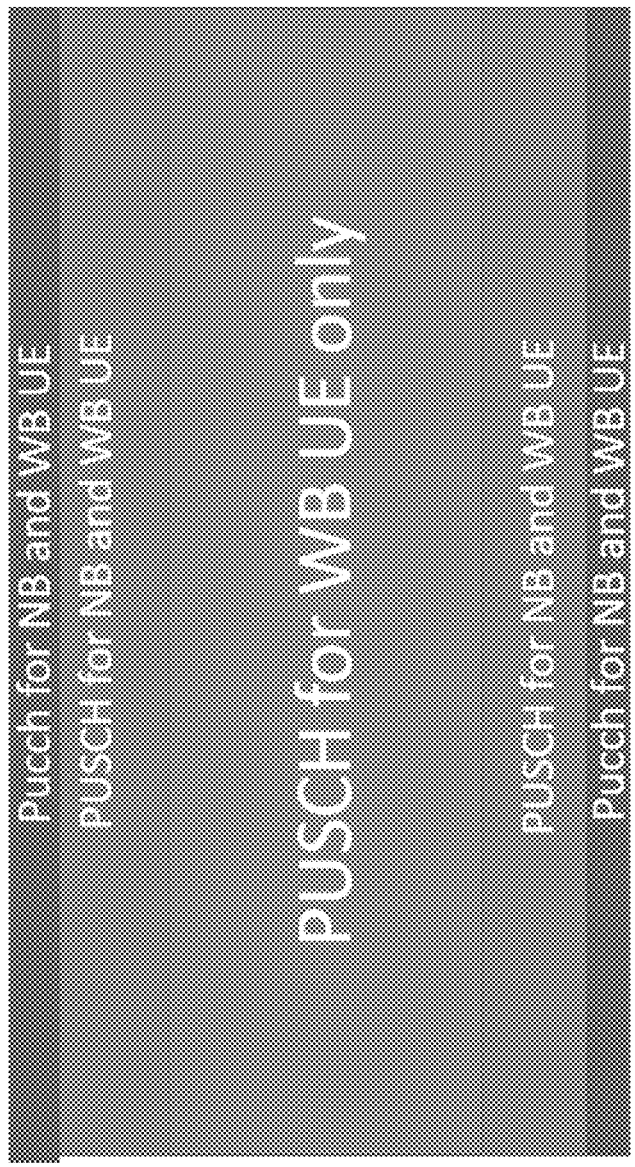
FIG. 6 illustrates a situation in which NB UEs are located at the edge of the carrier bandwidth when NB and WB UEs coexist, according to an embodiment.

FIG. 6 illustrates a situation in which NB UEs are located at the edge of the carrier bandwidth when NB and WB UEs coexist, according to an embodiment.

As shown in FIG. 6, the PUCCH is at the edge of carrier bandwidth. If an NB UE transmits within the carrier bandwidth, one PUCCH can be aligned with the PUCCH of the WB carrier bandwidth, but the other PUCCH will be in the middle of the resources. One solution is to simply drop the PUCCH that would be in the middle of the carrier bandwidth, as shown in FIG. 6.

However, this may not be sufficient for NB UEs since they only have access to a limited bandwidth. As described in the previous section, BWP hopping can then be used. However, the hopping pattern may be simplified such that the UE alternates between the bottom part and the top part of the WB carrier bandwidth. In this case, there are two possible resources to hop. Consequently, this pattern may not need to be signaled and may be used by default for NB UEs. In this case only the lower and top parts can be used, which may not be sufficient if a lot of NB UEs are present. Therefore, a more scalable solution may be necessary if a lot of NB UEs are present.

Figure 7:
FIG. 7 illustrates a situation in which NB UEs are located anywhere in the carrier bandwidth when NB and WB UEs coexist, according to an embodiment.

FIG. 7 illustrates a situation in which NB UEs are located anywhere in the carrier bandwidth when NB and WB UEs coexist, according to an embodiment.

Referring to FIG. 7, to mitigate resource fragmentation, steps may be taken when NB UEs are located anywhere in the carrier bandwidth. For example, the PUCCH can be located in the middle of the WB carrier bandwidth. If this is the case, then the WB UE may skip resources where a PUCCH can potentially be located.

The NB UE can transmit its PUCCH at different locations. The DCI for the NB UE indicates where to transmit the PUCCH. In this case, the NB UE does not have a fixed frequency region for where to transmit the PUCCH. The PUCCH frequency allocation may be dynamically indicated each time the UE has to transmit the PUCCH. For example, for each PDSCH, the network indicates, in the DCI, which PRB to transmit the corresponding PUCCH on, and it can change from frame to frame. This includes defining a new DCI format (or modifying an existing one). By selecting the PUCCH location for NB UEs, the gNB can ensure that the PUCCHs are located around the PUSCHs of WB UEs, thereby reducing fragmentation.

Furthermore, the WB UE may skip resources where the PUCCH is located. In this case, the WB UE is aware of the location of the RBs where the NB UE can transmit the PUCCH. If the WB UE receives an assignment that overlaps with the potential PUCCHs, the WB UE may skip these RBs.

Figure 8:
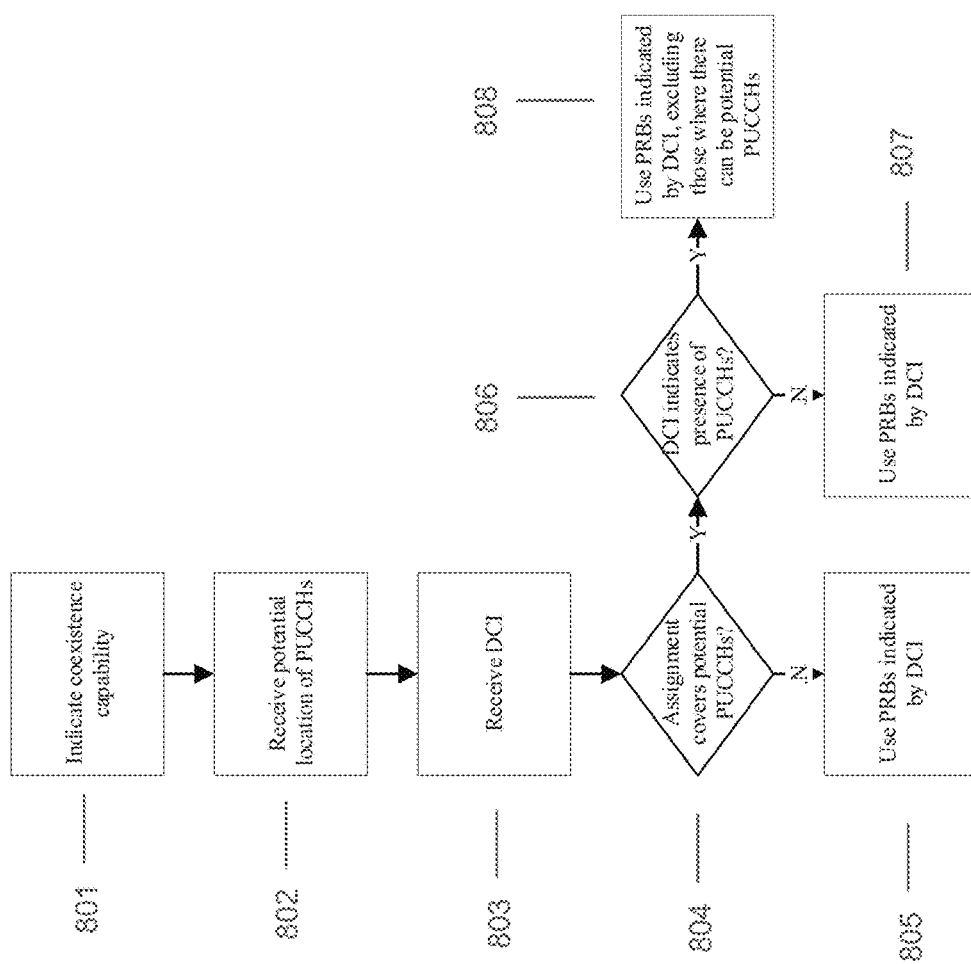
FIG. 8 illustrates a flowchart for when a WB UE skips resources where the PUCCH can be located, according to an embodiment.

FIG. 8 illustrates a flowchart for when a WB UE skips resources where the PUCCH can be located, according to an embodiment.

In such a case, the WB UE may be aware of the location of the RBs where the NB UE can transmit the PUCCH. If the WB UE receives an assignment that overlaps with the potential PUCCHs, the WB UE may skip these RBs.

Referring to FIG. 8, the WB UE indicates a coexistence capability in step 801. In order to ensure backwards compatibility, the WB UE may indicate if it is capable of skipping potential PUCCHs. This can be done during the UE capability exchange with the gNB.

At step 802, the UE receives potential location(s) of PUCCHs. The WB UE should be aware of where the PUCCHs are located. Accordingly, the gNB may send these locations to the WB UE. This can be done by the gNB sending an RRC message containing a bitmap indicating where the potential PUCCHs are present.

At step 803, the WB UE receives the DCI. To do this, the WB UE may engage in normal operation and monitor the PDCCH. The WB UE can receive a DCI with an assignment for the WB UE.

At step 804, the WB UE determines whether an assignment covers (e.g., conflicts with) potential PUCCHs by obtaining the FDRA field of the DCI and assessing whether it overlaps with potential PUCCHs. If the assignment does not cover potential PUCCHs, then the WB UE performs a transmission on the PRBs indicated by the FDRA in step 805.

If the assignment does cover potential PUCCHs, the WB UE determines whether the DCI indicates the presence of PUCCHs in step 806. To do this, the UE may identify a second field in the DCI: (e.g., a coexistence field). This field may be a Boolean indicator: if set to 0, it indicates no transmitted PUCCH.

If the DCI does not indicate the presence of PUCCHs (e.g., the coexistence field is set to 0), the WB UE performs a transmission on the PRBs indicated by the FDRA in step 807. If the DCI indicates the presence of PUCCHs (e.g., the coexistence field is set to 1 indicating that PUCCHs are transmitted), the WB UE may use PRBs indicated by DCI, excluding those where there can be potential PUCCHs in step 808. In this case, the WB UE may perform a transmission on the PRBs indicated by the FDRA, but exclude the PRBs where the potential PUCCHs are located.

According to an embodiment, the presence of PUCCH may not be indicated in the DCI, and the WB UE may assume that the PUCCHs are always present and may exclude these resources.

In addition, an NB UE may transmit its PUCCH anywhere in the carrier bandwidth. In this case, instead of using the PRBs at the edge of the cell, the NB UE can transmit its PUCCH anywhere in the carrier bandwidth. Accordingly, a new field may be added in the DCI (e.g., a PUCCH location field). This field may indicate the PRB where the NB UE can transmit the PUCCH. In order to limit the overhead, this field could be an index to configured potential PUCCH locations. This field may only be present for NB UEs.

Figure 9:
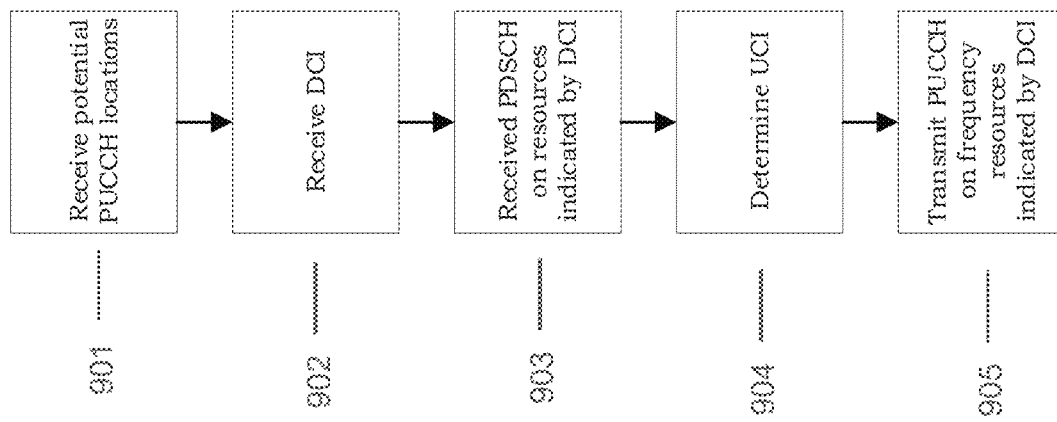
FIG. 9 illustrates a flowchart for when an NB UE transmits its PUCCH anywhere in the carrier bandwidth, according to an embodiment.

FIG. 9 illustrates a flowchart for when an NB UE transmits its PUCCH anywhere in the carrier bandwidth, according to an embodiment. In this case, the PUCCH resources may be indicated by DCI.

Referring to FIG. 9, at step 901, the NB UE receives potential PUCCH locations. This may include a lookup table with the first entry being an index, and the second entry being a PRB index. This table may be used to reduce the number of possible locations of where to transmit the PUCCH, and to reduce the signaling overhead in the DCI. This table can be transmitted using RRC signaling or using a MAC CE.

In step 902, the NB UE receives the DCI. The NB UE may monitor the PDCCH and receive DCI with a grant for that NB UE. In step 903, the received PDSCH on resources are indicated by the DCI. From the DCI, the NB UE may obtain the time/frequency resources of where to receive the PDSCH. The NB UE may then proceed to transmit the PDSCH.

At step 904, the NB UE determines uplink control information (UCI). From the DCI and the received PDSCH, the NB UE may then determine the information to transmit on the PUCCH (e.g., HARQ information).

At step 905, the NB UE transmits PUCCH on frequency resources indicated by the DCI. From the DCI, the UE may obtain the frequency resources of where to transmit the PUSCH, as well as the time resources (already present in existing DCI). The NB UE then proceeds to transmit the PDSCH.

Accordingly, the embodiment illustrated in FIG. 9 provides improved communication techniques for NB UEs with dynamic grants, but not for UEs with SPS transmission. For SPS, however, the NB UE may receive a DCI that indicates the PUCCH resources only, but omits the PDSCH resources since they already are known by the SPS configuration. The UE can then proceed as described above. In addition, the DCI may be a group DCI to reduce the overhead.

In some cases, a UE may be able to receive an entire bandwidth (e.g., 20 MHz), but can only transmit data on a subset of the bandwidth. For instance, as per radio access network (RAN) #109 agreements, in the eRedCap SI, the options BW3 and PR3 describe such a solution. Option BW1 is for when both RF and baseband (BB) bandwidths are 5 MHz for UL and DL.

Option BW3 is for a 5 MHz BB bandwidth only for PDSCH (for both unicast and broadcast) and PUSCH with 20 MHz RF bandwidth for UL and DL. The other physical channels and signals are still allowed to use a BWP up to the 20 MHz maximum UE RF+BB bandwidth.

In addition, options PR1, PR2, and PR3 may be applied for further UE peak rate reduction. Option PR1 involves relaxation of the constraint for peak data rate reduction. Option PR2 involves restriction of maximum transport block size (TBS) for PDSCH and PUSCH. Option PR3 involves restriction of a maximum number of PRBs for PDSCH and PUSCH.

The effects of PR3 and BW3 can be considered to be equivalent. PR3 can be viewed as a logical extension of BW3 where 5 MHz is occupied within a 20 MHz bandwidth, but where the occupied PRBs are not necessarily contiguous. Thus, BW3 may be described herein, with the extension to PR3 being implicit. In addition, the present disclosure describes some terms in the form of downlink, and the implicit extension to uplink should be obvious to one of ordinary skill in the art. The present application provides an efficient (a low signaling overhead) way of indicating the DL frequency resource assignment (which shall be within max 5 MHz bandwidth of PDSCH/PUSCH) in the frequency hopping operation across frequency range of 20 MHz of the max DL and UL BWP for an eRedCap UE.

Figure 10:
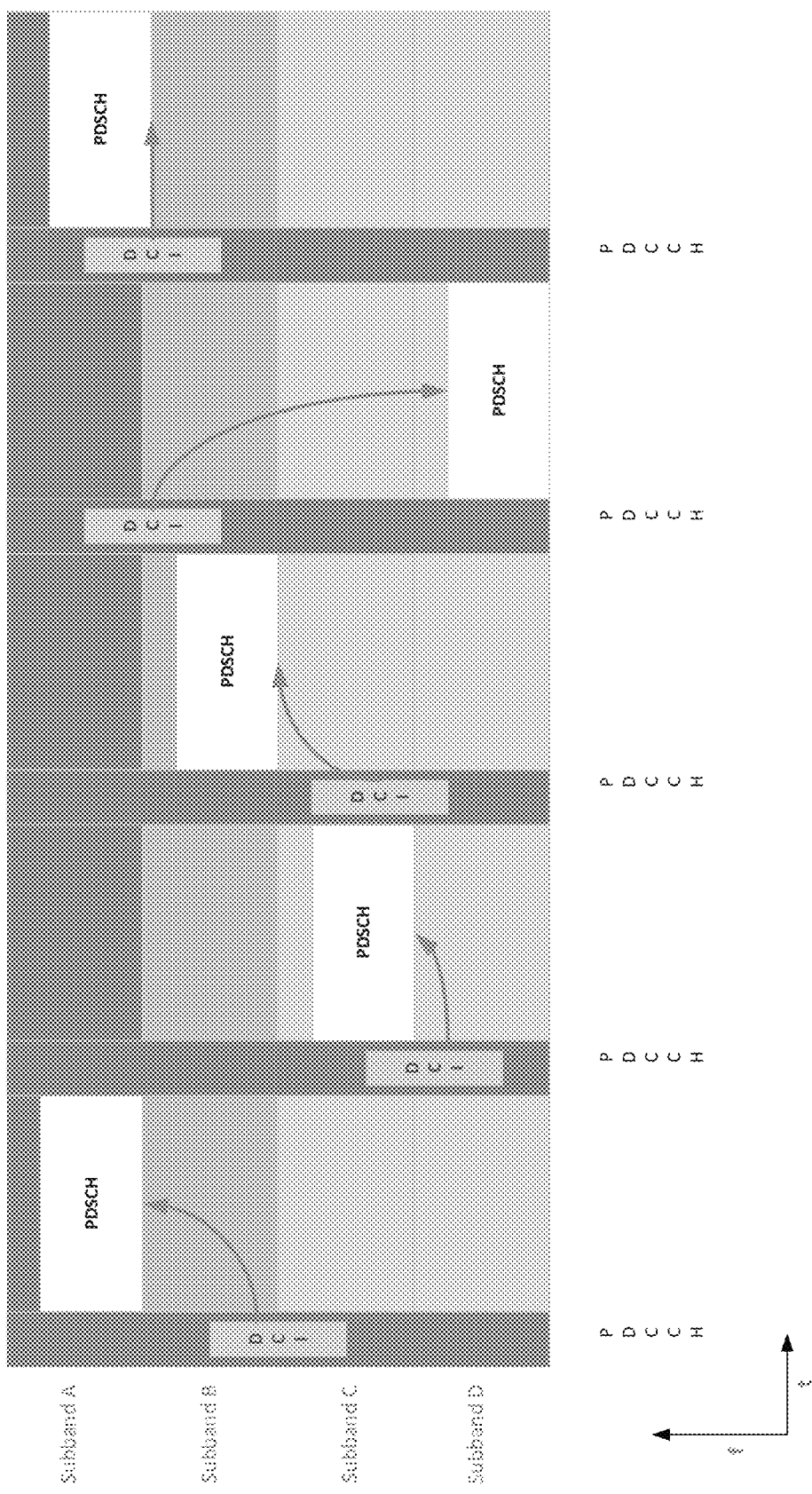
FIG. 10 illustrates frequency hopping for the downlink for PDSCH, according to an embodiment.

FIG. 10 illustrates a frequency hopping for the downlink for PDSCH, according to an embodiment.

Figure 11:
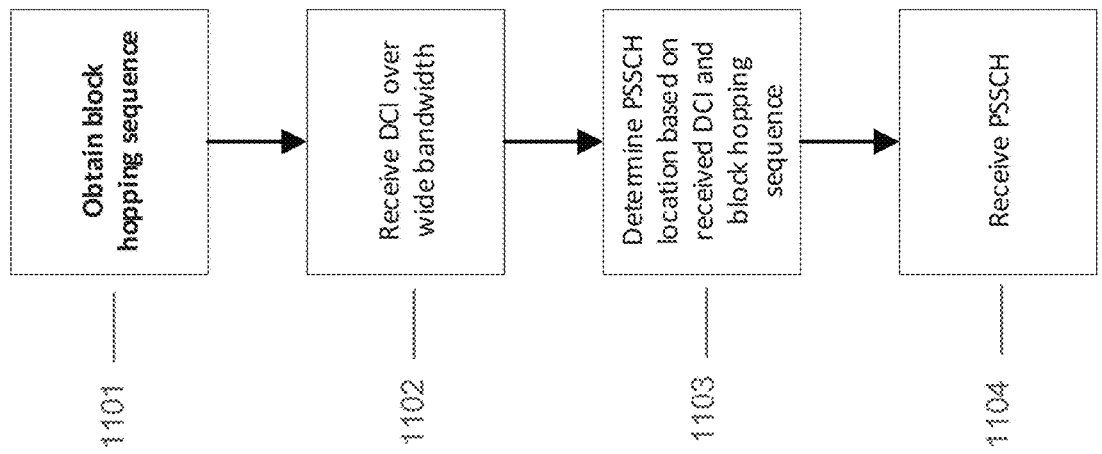
FIG. 11 illustrates a flowchart describing a UE hopping operation, according to an embodiment.

FIG. 11 illustrates a flowchart describing a UE hopping operation, according to an embodiment.

Referring to FIGS. 10-11, in step 1101, the UE obtains a block hopping sequence. A frequency RB block hopping sequence may be provided in the same manner as the vBWP configuration described above. The frequency RB block (or RB sub-band) hopping sequence can be communicated by system information block (SIB)1/eSIB1 or UE specific RRC signaling which the latter depends on parameters such as a UE ID, etc. Alternatively, a frequency RB block hopping sequence of 5 MHz sub-bands may be dynamically indicated in DCI e.g., via indicating that the first RB index in the first RB block (or RB sub-band) is to perform RB block level hopping.

The parameters of the sequence may be blocks of 5 MHz bandwidth size in a 20 MHz bandwidth. For instance, subband A (e.g., the term "subband" may be used interchangeably with "block" and refers to a frequency band) could represent the 15-20 MHz part of the carrier bandwidth, subband B could represent the 10-15 MHz part of the carrier bandwidth, subband C could represent the 5-10 MHz part of the carrier bandwidth, and subband D could represent the 0-5 MHz part of the carrier bandwidth (note: in practice, those would be defined as a set of PRBs, and may not exactly match a 5 MHz bandwidth. The frequency RB blocks can be non-overlapping as in FIG. 10. Alternatively, the frequency RB blocks can be partially overlapped e.g., in the case of SCS of 30 KHz in 5 MHz has 11 RBs). For instance, the frequency RB block hopping sequence in FIG. 10 is subband A, subband C, subband B, subband D, subband A, etc.

Additional frequency RB block hopping may be introduced to allow the frequency diversity with low signaling overhead, without changing the existing DL frequency allocation type 0 and type 1 within every single frequency RB block which is max of 5 MHz bandwidth.

Referring to FIG. 11, in step 1102, the UE receives DCI over WB. In this step, the UE attempts to receive the DCI based on release (Rel)-17 RedCap procedures. The UE operates in a CORESET that is located within the 20 MHz carrier bandwidth, but can occupy more than 5 MHz. The CORESET location is independent of the subframes.

The DCI content and sized, however, may be different. For example, the frequency resource indicator value (FRIV) field of the DCI may be encoded differently than for a 20 MHz RedCap UE. The FRIV may indicate a set of occupied RBs as if the carrier bandwidth size was 5 MHz (The addition is to indicate the index of frequency RB block where the UE receives the PDSCH, mimic the BWP hopping concept, as described above).

In the FDRA field, the RB block can be indexed using the start RB index of the RB block. Thus, the FDRA field can include starting RB index+RBG-level BITMAP over the 5 MHz data bandwidth.

The bit size of the FDRA field may be 9 bits including 6 bits for starting RB indication (based on every RB), and 3 bits for BITMAP (11 RB for 5 MHz with 30 KHz SCS, RBG size: 4).

Advantageously, the number of bits in the FRIV can be reduced by 4 bits (FRIV size may be log 2(N(N+1)/2). N-_>4N (5→20 MHz) increases the size by log 2(16)=4). However, there can be edge effects, and the bit size may vary (e.g., 3 or 5 bits).

Referring to FIG. 11, in step 1103, the UE determines the PSSCH location based on the received DCI block hopping sequence. The UE may combine the FRIV of the DCI with the blocking sequence if the FRIV occupies the bandwidth [f1, f2], the actual frequency occupation is offset by n, with n=0 for subband D, n=1 for subband C, n=2 for subband B, and n=3 for subband A. (note: this is an approximation: if the FRIV indicates PRB a . . . b, the allocation would be PRBs a . . . b of the subband of the block hopping sequence).

In step 1104, the UE receives the PSSCH, and the UE may obtain the PDSCH on the determined frequency resource allocation.

Although the disclosure is described using dynamic grant, it can be extended to semi-persistent allocation, configured grants, etc. In such a case, the UE may receive an allocation for a 5 MHz channel, and apply it to the frequency RB block where it has to transmit according to the frequency RB block hopping sequence.

Additionally or alternatively, a pre-defined mapping between the CCEs may be provided, where DCI is transmitted at specific hop and the specific frequency RB subbands where PDSCH is transmitted. Accordingly, the DCI may not explicitly include the hop indication, but the hop instructions may be implicitly determined. Additionally, the specific frequency RB block of 5 MHz can be semi-static configured or mapped via RRC for a given BWP of 20 MHz, without the hopping pattern. Thus, once the UE decodes the PDCCH of 20 MHz, it then can by default (e.g., automatically) decode the corresponding 5 MHz frequency RB block for PDSCH reception.

Furthermore, the first DCI may indicate the FRIV in the first frequency RB block and then FRIV value may remain the same in the remaining hops. Thus, the DCI after the $1^{st}$ DCI may not be needed during a fixed duration of a hopping operation.

Figure 12:
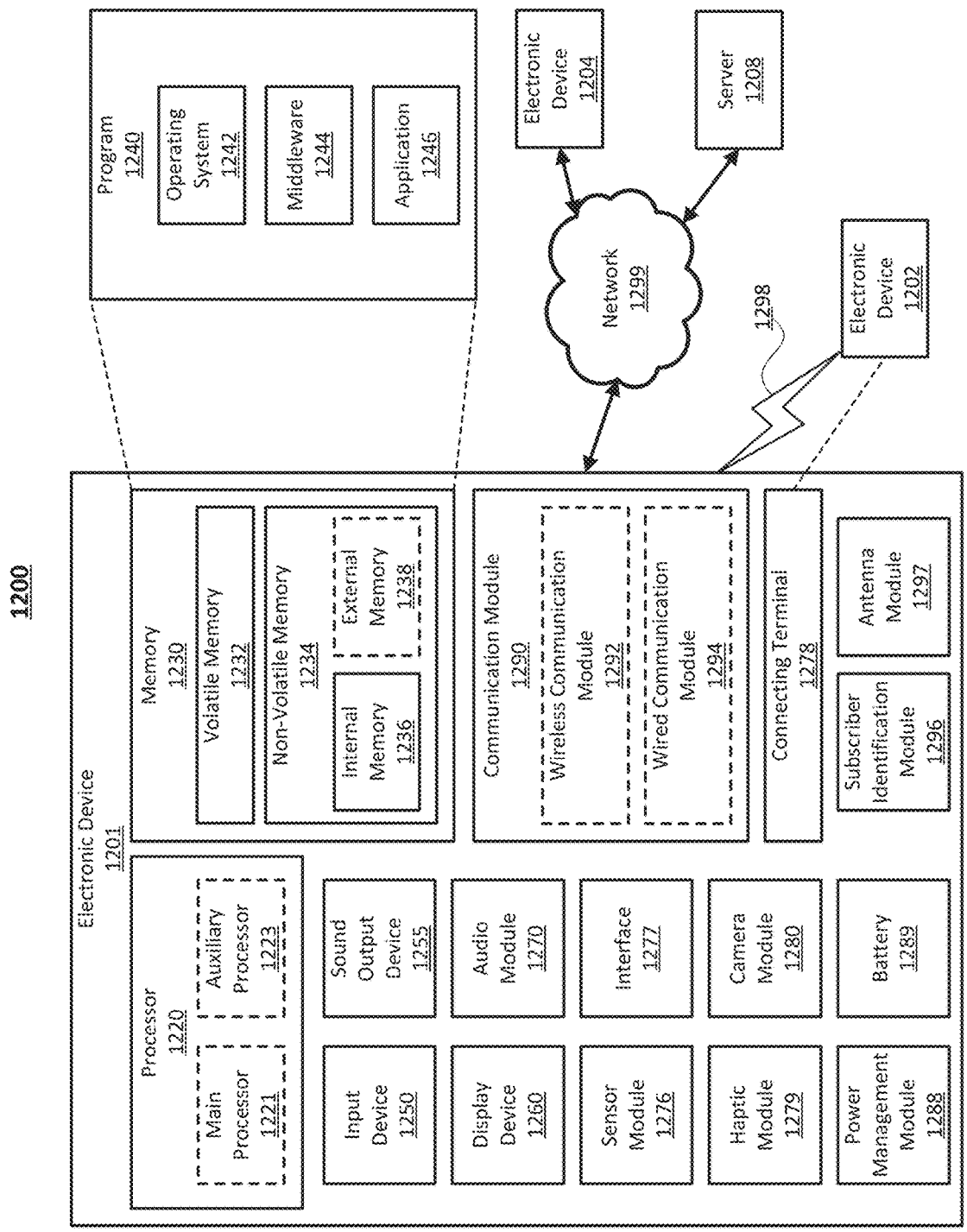
FIG. 12 is a block diagram of an electronic device in a network environment, according to an embodiment.

FIG. 12 is a block diagram of an electronic device in a network environment 1200, according to an embodiment.

FIG. 12 depicts an example system for performing frequency hopping. The steps described above may be controlled and/or performed by processors (e.g., controllers) over network environments described below, with reference to FIG. 12.

Referring to FIG. 12, an electronic device 1201 in a network environment 1200 may communicate with an electronic device 1202 via a first network 1298 (e.g., a short-range wireless communication network), or an electronic device 1204 or a server 1208 via a second network 1299 (e.g., a long-range wireless communication network). The electronic device 1201 may communicate with the electronic device 1204 via the server 1208. The electronic device 1201 may include a processor 1220, a memory 1230, an input device 1240, a sound output device 1255, a display device 1260, an audio module 1270, a sensor module 1276, an interface 1277, a haptic module 1279, a camera module 1280, a power management module 1288, a battery 1289, a communication module 1290 (e.g., a transceiver), a subscriber identification module (SIM) card 1296, or an antenna module 1294. In one embodiment, at least one (e.g., the display device 1260 or the camera module 1280) of the components may be omitted from the electronic device 1201, or one or more other components may be added to the electronic device 1201. Some of the components may be implemented as a single integrated circuit (IC). For example, the sensor module 1276 (e.g., a fingerprint sensor, an iris sensor, or an illuminance sensor) may be embedded in the display device 1260 (e.g., a display).

The processor 1220 may execute software (e.g., a program 1240) to control at least one other component (e.g., a hardware or a software component) of the electronic device 1201 coupled with the processor 1220 and may perform various data processing or computations.

As at least part of the data processing or computations, the processor 1220 may load a command or data received from another component (e.g., the sensor module 1246 or the communication module 1290) in volatile memory 1232, process the command or the data stored in the volatile memory 1232, and store resulting data in non-volatile memory 1234. The processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or execute a particular function. The auxiliary processor 1223 may be implemented as being separate from, or a part of, the main processor 1221.

The auxiliary processor 1223 may control at least some of the functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). The auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by another component (e.g., the processor 1220) of the electronic device 1201, from the outside (e.g., a user) of the electronic device 1201. The input device 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. The display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. The audio module 1270 may obtain the sound via the input device 1250 or output the sound via the sound output device 1255 or a headphone of an external electronic device 1202 directly (e.g., wired) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. The sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device 1202 directly (e.g., wired) or wirelessly. The interface 1277 may include, for example, a high-definition multimedia interface (HDMI), a universal serial bus (USB) interface, a secure digital (SD) card interface, or an audio interface.

A connecting terminal 1278 may include a connector via which the electronic device 1201 may be physically connected with the external electronic device 1202. The connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or an electrical stimulus which may be recognized by a user via tactile sensation or kinesthetic sensation. The haptic module 1279 may include, for example, a motor, a piezoelectric element, or an electrical stimulator.

The camera module 1280 may capture a still image or moving images. The camera module 1280 may include one or more lenses, image sensors, image signal processors, or flashes. The power management module 1288 may manage power supplied to the electronic device 1201. The power management module 1288 may be implemented as at least part of, for example, a power management integrated circuit (PMIC).

The battery 1289 may supply power to at least one component of the electronic device 1201. The battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the AP) and supports a direct (e.g., wired) communication or a wireless communication. The communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or a standard of the Infrared Data Association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. The antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

Commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. All or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A user equipment (UE) apparatus for wireless communication with an external device, the UE apparatus comprising:
   a transceiver; and
   a processor configured to:
   receive, via the transceiver, a radio resource control (RRC) signal;
   determine a virtual bandwidth part (vBWP) based on the RRC signal, the vBWP including a plurality of narrowband (NB) bandwidth parts (BWPs) in a carrier bandwidth for the UE to perform communication at a given time instance, and
   determine a bandwidth location in the carrier bandwidth of at least one of the plurality of NB BWPs,
   wherein if a first relative frequency of the bandwidth location in a first NB BWP is the same as a second relative frequency of a bandwidth location in a second NB BWP, then information included in downlink control information (DCI) is re-used to identify the bandwidth location.

2. The UE of claim 1, wherein the processor is further configured to:
   determine the location of at least one of the plurality of vBWPs based on a hop duration in terms of a number of slots, a gap in terms of a number of slots, or a hop offset amount along a carrier bandwidth.

3. The UE of claim 1, wherein the processor is further configured to:
   switch the UE to an active or initial BWP for paging reception, system information (SI) updates, radio link monitoring or beam failure detection.

4. The UE of claim 3, wherein switching the UE to the active BWP further comprises:
   receiving, via the transceiver, an RRC configuration message indicating the UE to switch to the active or initial BWP including, at least one of, control resource set (CORESET) 0 and the times at which switching should occur.

5. The UE of claim 3, wherein switching the UE to the active or initial BWP further comprises:
   defining a hopping pattern for the vBWP to periodically locate a BWP including control resource set (CORESET) 0.

6. The UE of claim 3, wherein the vBWP is used for data transmission only.

7. The UE of claim 1, wherein the processor is further configured to:
   receive a block hopping sequence to communicate over resource blocks (RBs) on a set of predetermined or dynamically determined communication frequency ranges, such as the plurality of NB BWPs, in the carrier bandwidth.

8. The UE of claim 7, wherein a communication frequency of one or more RBs is determined using a frequency domain resource allocation (FDRA) field of one or more current RBs of the vBWP.

9. The UE of claim 1, wherein the bandwidth location of the at least one of the plurality of NB BWPs is located at an edge of the carrier bandwidth when NB UEs and wideband (WB) UEs coexist in the carrier bandwidth.

10. The UE of claim 1, wherein the bandwidth location of the at least one of the plurality of NB BWPs is located at a predefined location in the carrier bandwidth when NB UEs and wideband (WB) UEs coexist in the carrier bandwidth.

11. A method performed by a user equipment (UE) for wireless communication with an external device, the method comprising:
receiving a radio resource control (RRC) signal;
determining a virtual bandwidth part (vBWP) based on the RRC signal, the vBWP including a plurality of narrowband (NB) bandwidth parts (BWPs) in a carrier bandwidth for the UE to perform communication at a given time instance, and
determining a bandwidth location in the carrier bandwidth of at least one of the plurality of NB BWPs,
wherein if a first relative frequency of the bandwidth location in a first NB BWP is the same as a second relative frequency in a second NB BWP, then information included in downlink control information (DCI) is re-used to identify the bandwidth location.

12. The method of claim 11, further comprising:
determining the location of at least one of the plurality of vBWPs based on a hop duration in terms of a number of slots, a gap in terms of a number of slots, or a hop offset amount along a carrier bandwidth.

13. The method of claim 11, further comprising:
switch the UE to an active or initial BWP for paging reception, system information (SI) updates, radio link monitoring or beam failure detection.

14. The method of claim 13, wherein switching the UE to the active or initial BWP further comprises:
receiving, via the transceiver, an RRC configuration message indicating the UE to switch to the active or initial BWP including, at least one of, control resource set (CORESET) 0 and the times at which switching should occur.

15. The method of claim 13, wherein switching the UE to the active or initial BWP further comprises:
defining a hopping pattern for the vBWP to periodically locate a BWP including control resource set (CORESET) 0.

16. The method of claim 13, wherein the vBWP is used for data transmission only.

17. The method of claim 11, further comprising:
receiving a block hopping sequence to communicate over resource blocks (RBs) on a set of predetermined or dynamically determined communication frequency ranges, such as the plurality of NB BWPs, in the carrier bandwidth.

18. The method of claim 17, wherein a communication frequency of one or more RBs is determined using a frequency domain resource allocation (FDRA) field of one or more current RBs of the vBWP.

19. The method of claim 11, wherein the bandwidth location of the at least one of the plurality of NB BWPs is located at an edge of the carrier bandwidth when NB UEs and wideband (WB) UEs coexist in the carrier bandwidth.

20. The method of claim 11, wherein the bandwidth location of the at least one of the plurality of NB BWPs is located at a predefined location in the carrier bandwidth when NB UEs and wideband (WB) UEs coexist in the carrier bandwidth.

* * * * *